US010020004B2

(12) United States Patent
Jones et al.

(10) Patent No.: US 10,020,004 B2
(45) Date of Patent: Jul. 10, 2018

(54) LISTENING TO THE FRONTEND

(71) Applicant: Wal-Mart Stores, Inc., Bentonville, AR (US)

(72) Inventors: Nicholaus A. Jones, Fayetteville, AR (US); Aaron J. Vasgaard, Rogers, AR (US); Robert J. Taylor, Rogers, AR (US); Matthew A. Jones, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/492,608

(22) Filed: Apr. 20, 2017

(65) Prior Publication Data
US 2017/0309290 A1 Oct. 26, 2017

Related U.S. Application Data

(60) Provisional application No. 62/325,589, filed on Apr. 21, 2016, provisional application No. 62/334,796, filed on May 11, 2016.

(51) Int. Cl.
*G10L 21/02* (2013.01)
*G10L 21/0208* (2013.01)
*G10L 19/02* (2013.01)
*G10L 25/18* (2013.01)

(52) U.S. Cl.
CPC .......... *G10L 21/0208* (2013.01); *G10L 19/02* (2013.01); *G10L 25/18* (2013.01)

(58) Field of Classification Search
CPC ...... G10L 21/0208; G10L 19/02; G10L 25/18
USPC ................................................. 340/7.4–7.45
See application file for complete search history.

(56) References Cited

U.S. PATENT DOCUMENTS

| 6,044,353 | A | 3/2000 | Pugliese |
| 7,309,965 | B2 | 12/2007 | Dowling |
| 8,462,212 | B1 | 6/2013 | Kundu |
| 8,706,555 | B2 | 4/2014 | Argue |
| 2002/0178048 | A1 | 11/2002 | Huffman |
| 2003/0164398 | A1 | 9/2003 | Walker |
| 2007/0186515 | A1 | 8/2007 | Ruetten |
| 2009/0265258 | A1 | 10/2009 | Regard |

(Continued)

FOREIGN PATENT DOCUMENTS

WO    2014185883    11/2014

OTHER PUBLICATIONS

PCT; App. No. PCT/US2017/028823; International Search Report and Written Opinion dated Jul. 13, 2017.

*Primary Examiner* — Allen T Cao
(74) *Attorney, Agent, or Firm* — Fitch, Even, Tabin & Flannery, LLP

(57) ABSTRACT

In some embodiments, apparatuses, and methods are provided herein pertaining to sound analysis in a shopping facility. In some embodiments, a system comprises one or more sound sensors distributed throughout at least a portion of a shopping facility and configured to receive at least sounds resulting from activity in the shopping facility and a control circuit, the control circuit configured to receive, from at least one of the one or more sound sensors, audio data, receive an indication of an employee, correlate the audio data and in the indication of the employee, and determine, based at least in part on the audio data and the indication of the employee, a performance metric for the employee.

20 Claims, 6 Drawing Sheets

(56) References Cited

U.S. PATENT DOCUMENTS

| | | |
|---|---|---|
| 2014/0089087 A1 | 3/2014 | Argue |
| 2014/0236653 A1 | 8/2014 | Farrell |
| 2014/0286517 A1* | 9/2014 | Luna .................... H04R 1/028 381/332 |
| 2015/0127431 A1 | 5/2015 | Thomas |
| 2017/0309273 A1* | 10/2017 | Jones .................... G10L 15/22 |

* cited by examiner

LISTENING TO THE FRONTEND

CROSS-REFERENCE TO RELATED APPLICATIONS

This application claims the benefit of U.S. Provisional Application No. 62/325,589, filed Apr. 21, 2016, and U.S. Provisional Application No. 62/334,796, filed May 11, 2016, which are incorporated herein by reference in their entirety.

TECHNICAL FIELD

This invention relates generally to sound analysis and, more specifically, to sound analysis in a shopping facility.

BACKGROUND

Many different types of sounds result from people in a shopping facility. For example, guests of the shopping facility may talk amongst each other or with employees of the shopping facility. Additionally, guests and employee movements and activities can generate additional sounds. A need exists for ways to capture the sounds resulting from people in the shopping facility and determine performance of employees based on those sounds.

BRIEF DESCRIPTION OF THE DRAWINGS

Disclosed herein are embodiments of systems, apparatuses, and methods pertaining to sound analysis in a shopping facility. This description includes drawings, wherein.

Figure 1:
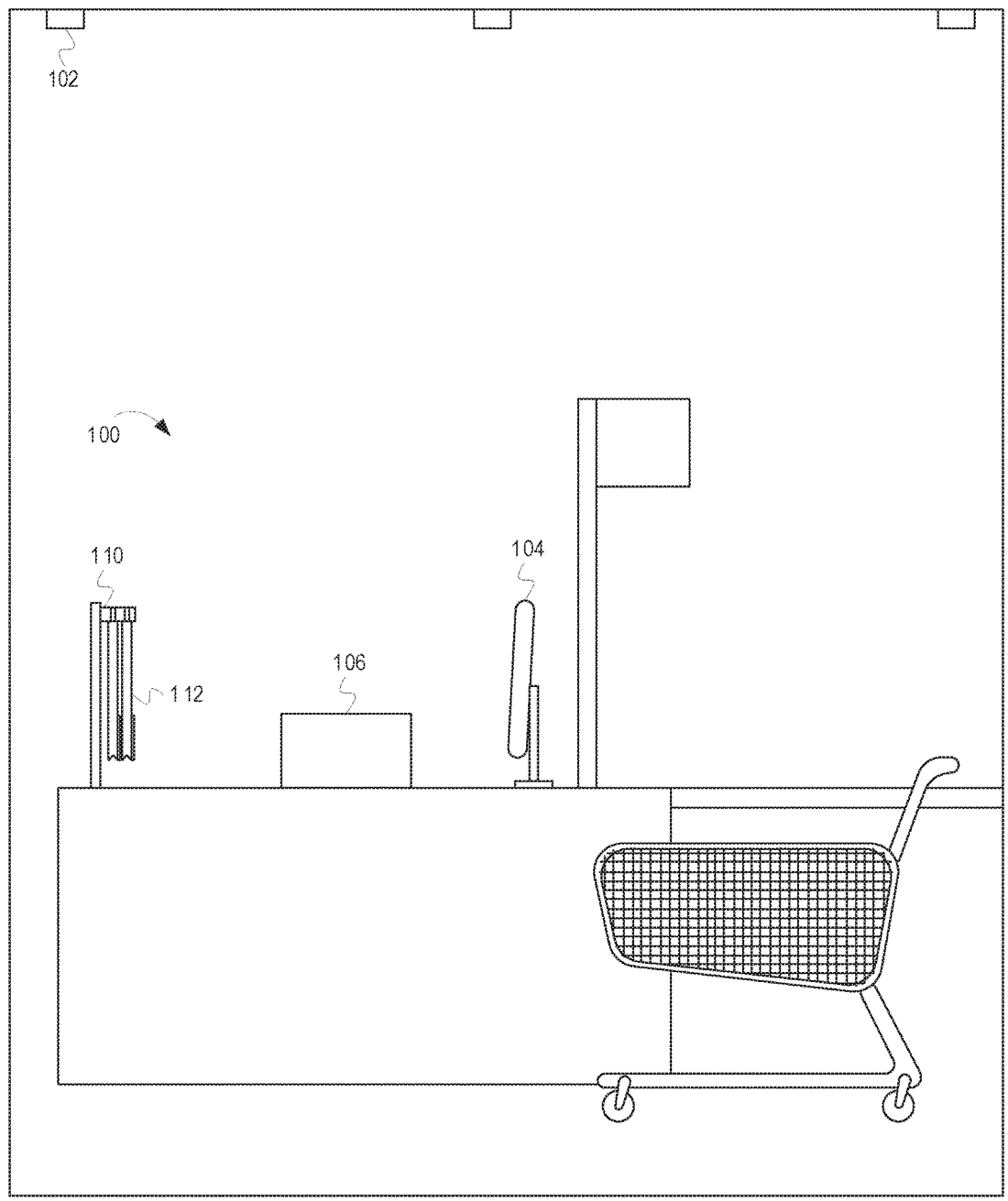
FIG. 1 depicts a shopping facility including sound sensors 102 positioned near a terminal 100, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful for performing sound analysis and determining a performance metric based on the captured sounds. In some embodiments, a system comprises one or more sound sensors distributed throughout at least a portion of a shopping facility and configured to receive at least sounds resulting from activity in the shopping facility and a control circuit. The control circuit is communicatively coupled to the one or more sound sensors. The control circuit is configured to receive, from at least one of the one or more sound sensors, audio data, receive an indication of an employee, correlate the audio data and the indication of the employee, and determine, based at least in part on the audio data and the indication of the employee, a performance metric for the employee.

Employee efficiency and performance can help decrease costs for a shopping facility as well as increase guest satisfaction. Tracking performance metrics for employees to ensure that the employees are performing their jobs efficiently and correctly can aid in achieving these costs savings and increases in guest satisfaction. One way to track performance metrics for employees is the use of a system including sound sensors near point of sale ("POS") terminals. The system can process audio data received from the sound sensors, correlate the audio data with an employee that is stationed at the terminal, and determine a performance metric for the employee based on the audio data. The sound sensors can capture audio data based on interactions between the employee and the guests, interactions between the guests, and sounds resulting from movement and/or actions of the employees and/or guests.

Audio data captured by the sound sensors can be used to determine a variety of performance metrics. For example, the sound sensors can capture noises (e.g., beeps) produced by a scanner when an employee scans an item and sounds created by bags (e.g., a bagging turnstile, rustling of bags, bags being placed in a cart, etc.). Based on the noises produced by the scanner the system can determine a number of items in the transaction. Based on the sounds created by the bags, the system can determine a number of bags used in the transaction. The system can then determine how many items an employee placed in each bag during the transaction based on this information. As another example, the sound sensors can capture sounds resulting from guests talking while waiting in line at a terminal or any other sounds resulting from the presence of guest (e.g., rustling noises). Based on distances between where the guests are talking and the sound sensors, the length of the line can be determined. Additionally, the sound sensors can capture audio of conversations between guests and an employee stationed at the terminal. The system can process the audio of the conversations to determine whether the employee stationed at the terminal is greeting guests.

FIG. 1 depicts a shopping facility including sound sensors 102 positioned near a terminal 100, according to some embodiments. The terminal 100 (i.e., a POS terminal) includes a computer 104, a scanner 106, and a bagging station 110 including bags 112. The bagging station 110 of the example terminal 100 depicted in FIG. 1 includes a support on which the bags 112 are hanging. However, embodiments can utilize other types of bagging stations, such as turnstiles. The sound sensors 102 are positioned to capture sounds resulting from people in the vicinity of the terminal 100 as well as sounds resulting from movements and activities of the people in the vicinity of the terminal 100. As depicted in FIG. 1, the sound sensors 102 are located in the ceiling of the shopping facility. However, in some embodiments, the sound sensors 102 can be located elsewhere in addition to, or in lieu of, the ceiling (e.g., on the terminal 100, in the floor, etc.).

In some embodiments, the sound sensors 102 can be used to determine performance metrics related to bagging efficiency, such as a number of items per bag, a number of bags used per transaction, etc. The sound sensors 102 can detect sounds associated with the bagging station 110 to determine a number of bags used. For example, the sound sensors 102 can be configured to detect sounds of a specific type or frequency, based on the expected characteristics of sounds generated by the bags 112. In one embodiment, the sound sensors 102 can also detect sounds resulting from the employee scanning products with the scanner 106. For example, the scanner 106 may emit a tone as each item is scanned. The sound sensors 102 can detect the tones and the number of items can be determined based on the number of tones detected by the sound sensors. Accordingly, the number of items per bag can be calculated based on the number of bags used and the number of items scanned. In an alternative embodiment, the number of items purchased can be determined based on POS data generated by the terminal 100. For example, the computer 104 can compile a list of items scanned by the employee. This POS data can be used to determine the number of items purchased. Based on the sounds resulting from the bags detected by the sound sensors 102 and the POS data, the number of items per bag can be determined. In some embodiments, only certain items are included in the items per bag calculation. For example, if POS data is used to determine the number of items purchased, the POS data can be used to exclude items that should not be bagged from the items per bag calculation (e.g., large items).

In some embodiments, the sound sensors 102 can be used to monitor interactions between guests of the shopping facility and the employee stationed at the terminal 100. For example, it may be beneficial for the employee to greet the guest and/or make small talk with the guest while the employee scans the items that the guest is purchasing. In such embodiments, the performance metric may be whether a conversation occurred between the employee and the guest. If the performance metric is simply to determine whether a conversation occurred between the employee and the guest, the system need only determine that the sound sensors 102 detected at least two distinct voices, or a pattern of speech that indicates that a conversation took place. If however the performance metric is based on the content of the conversation (e.g., was a specific greeting used or script followed), the system can process the audio detected by the sound sensors 102 (e.g., using speech recognition) to determine the performance metric.

Although FIG. 1 depicts the sound sensors 102 as positioned on the ceiling, the sound sensors 102 can be positioned in any suitable location. In some embodiments, the positions of the sound sensors 102 can also vary based on the performance metric. For example, if the performance metric is related to bagging efficiency, the sound sensors 102 can be positioned near the bagging station 110 and the scanner 106. As another example, if the performance metric is based on an interaction between the employee and the guest, the sound sensors 102 can be positioned on the terminal 100 near where the employee and guest are likely to stand. Additionally, in some embodiments, directional sound sensors 102 can be used. The directional sound sensors 102 need not, but can be, located on or near the terminal 100. The directional sound sensors 102 can be directed towards the terminal 100 or any other location of interest.

Figure 2:
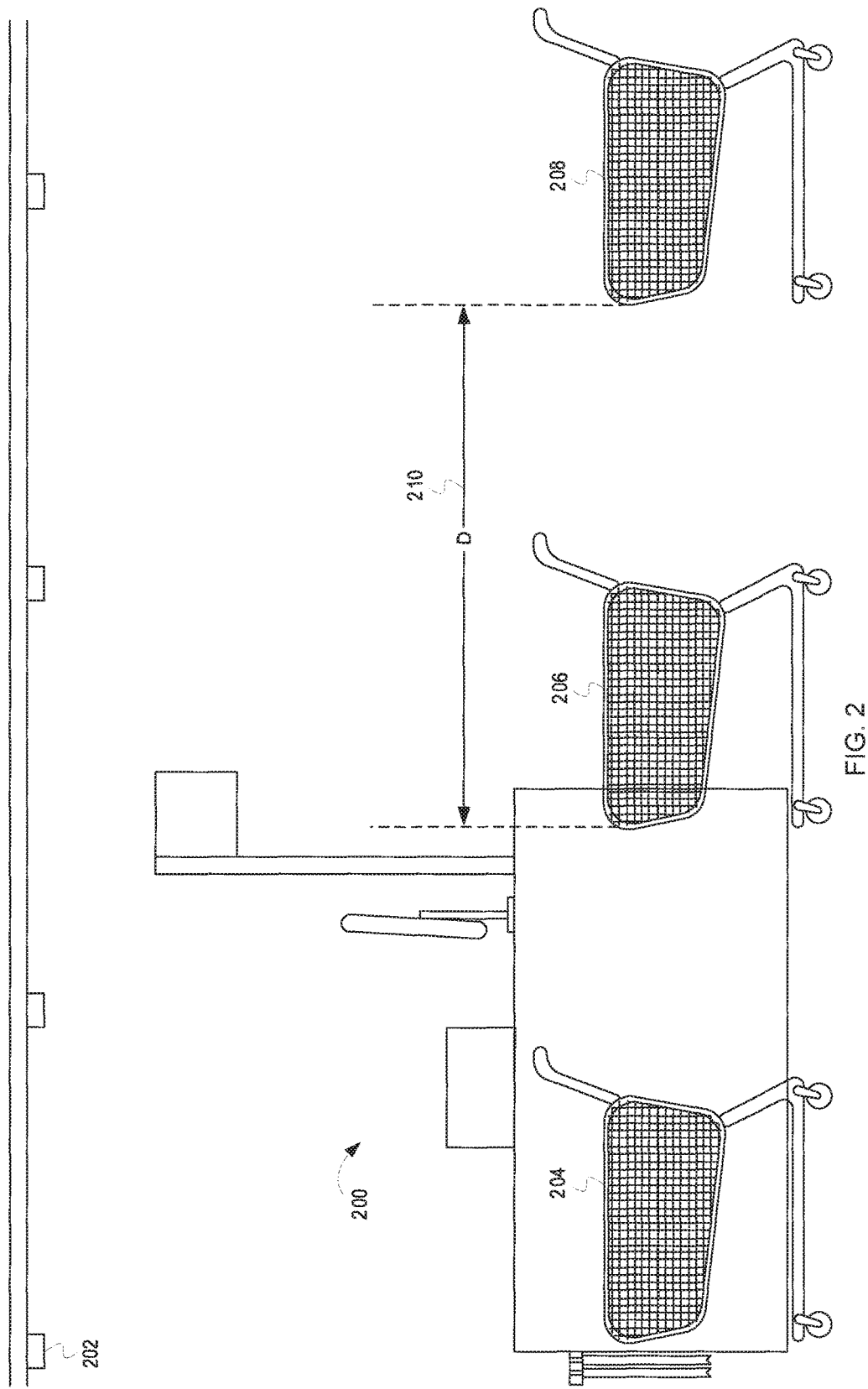
FIG. 2 depicts a system in a shopping facility including sound sensors 202 that is configured to determine the length of a line at the terminal 200 in a shopping facility based on signal strength, according to some embodiments.
Figure 3:
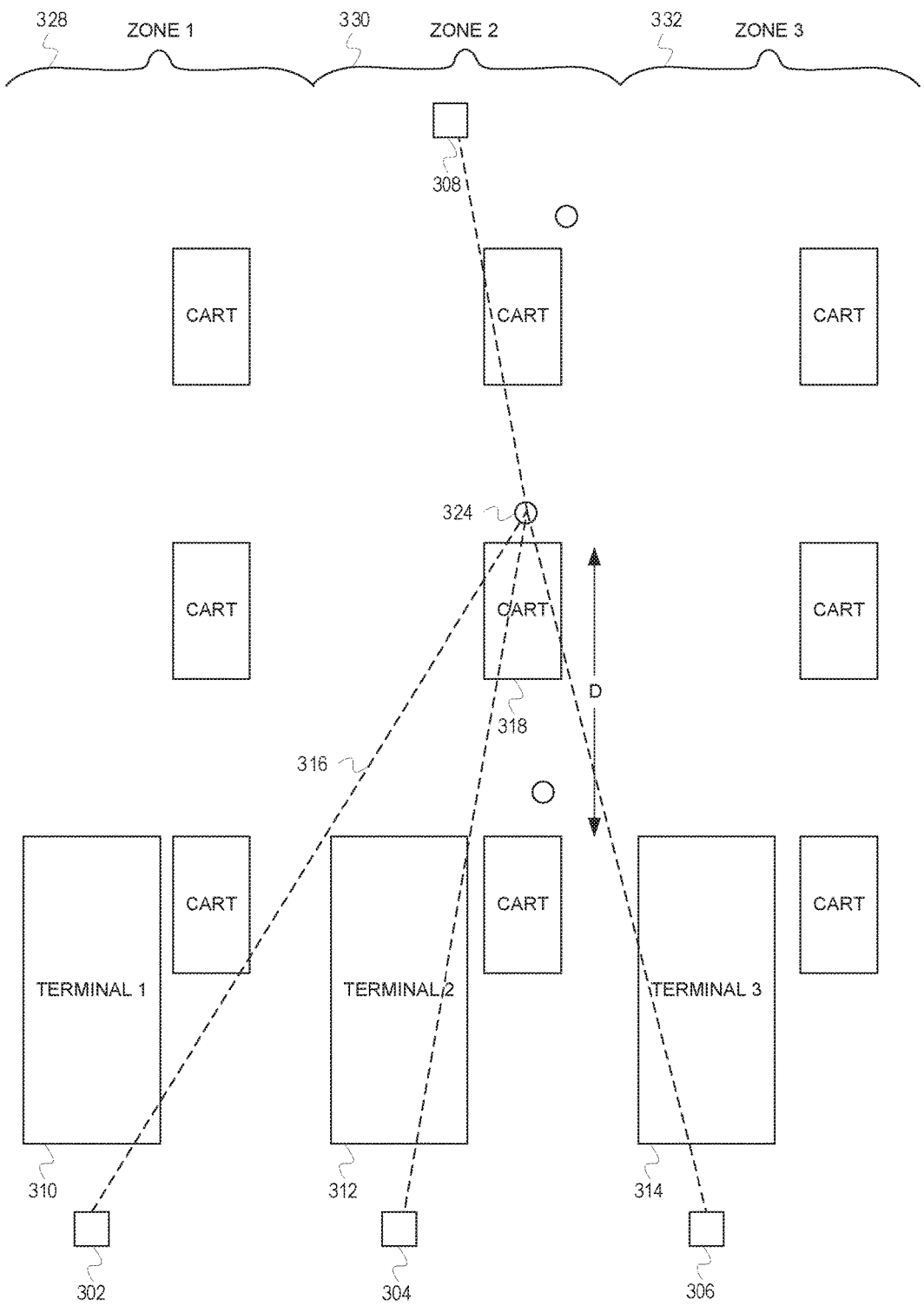
FIG. 3 depicts a system including multiple sound sensors that is configured to determine a length of a line at a terminal 312 in a shopping facility based on trilateration, according to some embodiments.
Figure 4:
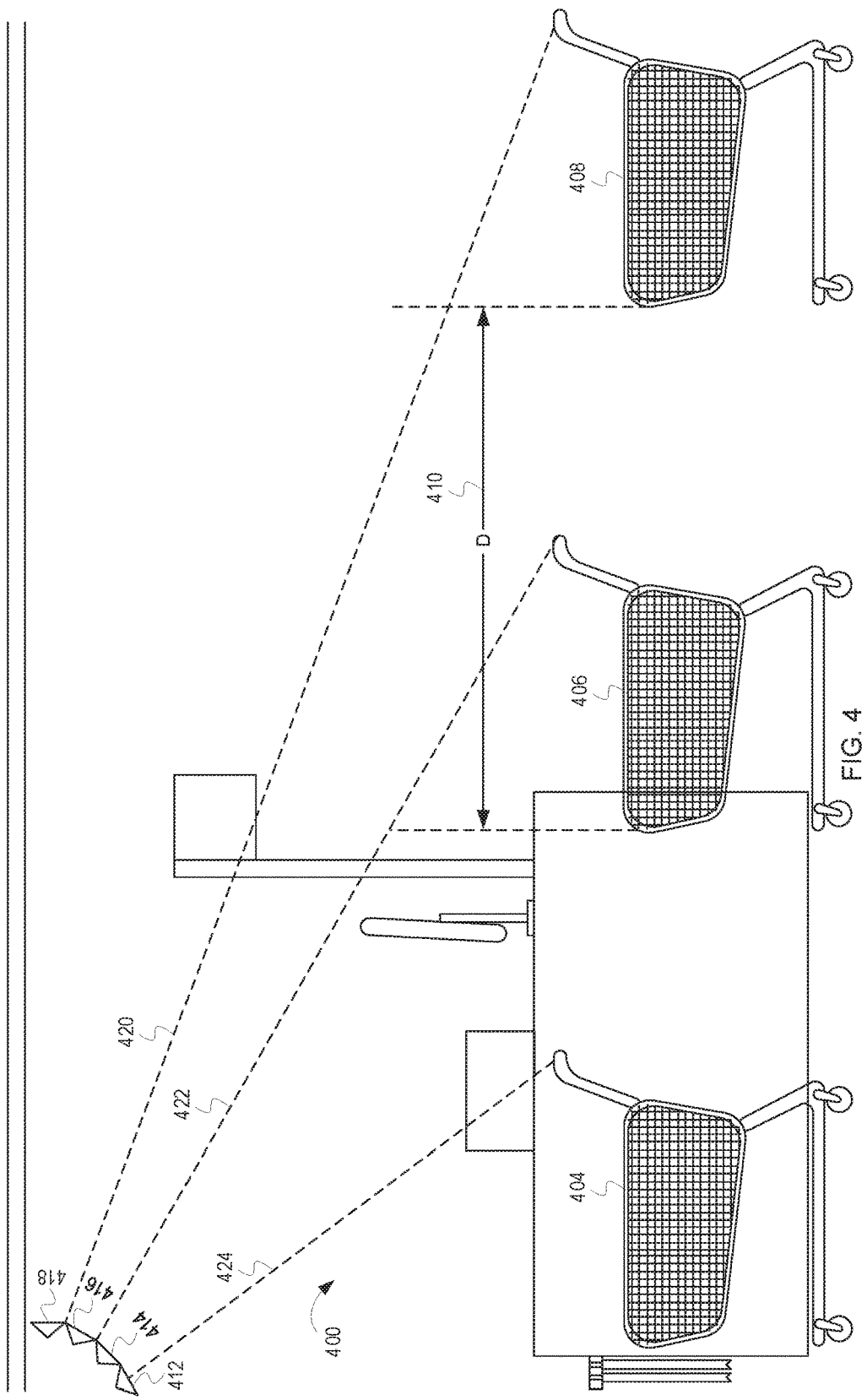
FIG. 4 depicts a system including a plurality of sound sensors that is configured to determine the length of a line at a terminal 400 in a shopping facility based on angles of received sound, according to some embodiments.

While FIG. 1 depicts, and the related text describes, systems for determining performance metrics for employees related to bagging efficiency and/or interactions between an employee and a guest, FIGS. 2-4 depict, and the related text describes, systems for determining performance metrics for employees related to line length. Line length can be used as a performance metric indicative of an employee's speed and/or efficiency at the terminal. Additionally, embodiments can be used to determine that a greater number of terminals than necessary is open, or that more terminals need to be opened based on the number of guests waiting in line.

FIG. 2 depicts a system including sound sensors 202 that is configured to determine the length of a line at the terminal 200 in a shopping facility based on signal strength, according to some embodiments. FIG. 2 includes the terminal 200, the sound sensors 202, and three carts (a first cart 204, a second cart 206, and a third cart 208). The sound sensors 202 can be used to determine the length of a line for the terminal 200. The length of the line for the terminal 200 can be used as a performance metric. The system depicted in FIG. 2 determines the length of the line based on the strength of signals captured by the sound sensor 202. The sound sensor 202 can be located after the terminal 200 and configured to capture sounds resulting from guests standing in line. The sounds captured by the sound sensor 202 will have varying signal strengths based on the distance from the sound sensor 202 the sounds are generated. For example, a first sound resulting from a guest standing behind the first cart 204 will have a greater signal strength than a second sound resulting from a guest standing behind the second cart 206, and the signal strength for the second sound will be greater than the signal strength for a third sounds resulting from a guest standing behind the third cart 208. The distances from the sound sensor 202 (or any other point, such as the terminal) can be calculated based on the determined signal strength. Furthermore, the average distance between carts (represented by distance "D" 210 in FIG. 2) can be used to determine how many guests are in line. For example, if the distance between the first sound and the second sound is greater than or equal to the average distance between carts, then at least two guests are in line. If the distance between the second sound and the third sound is greater than or equal to the average distance between carts (or the distance between the first sound and the third sound is greater than or equal to twice the average distance between carts), then three guests are in line.

While FIG. 2 depicts a system for determining line length based on signal strength, FIG. 3 depicts a system for determining line length based on trilateration.

FIG. 3 depicts a system including multiple sound sensors that is configured to determine a length of a line at a terminal 312 in a shopping facility based on trilateration, according to some embodiments. The system of FIG. 3 includes three terminals (a first terminal 310 in a first zone 328, a second terminal 312 in a second zone 330, and a third terminal 314 in a third zone 332). While FIG. 3 depicts three terminals, the system can be modified for use with any number of terminals. Each of the three zones has an associated sound sensor (i.e., the first zone 328 is associated with a first sound sensor 302, the second zone 330 is associated with a second sound sensor 304, and the third zone 332 is associated with a third sound sensor 314). When a guest 324 standing behind the cart 318 in line for the second terminal 312 talks or otherwise creates sound, the sound travels (depicted by lines 316) toward the first sound sensor 302, the second sound sensor 304, the third sound sensor 306, and a fourth sound sensor 308 (located on the opposite side of the terminals from the first sound sensor 302, the second sound sensor 304, and the third sound sensor 306). Because the guest 324 is not equidistant from each of the four sound sensors, the audio emanating from the guest 324 will arrive at each of the four sound sensors at different times. To ensure that the sound perceived by each of the sound sensors is the same sound, speech, voice, or any other type of audio recognition/analysis can be used. Once it is determined that the sound perceived by each of the sound sensors is the same sound, delays between when the sound was perceived by each of the sound sensors can be used to calculate not only in which line (i.e., zone) the guest 324 is standing, but also how far from the terminal the guest is standing. This distance, in conjunction with the average distance between carts (denoted by distance "D"), can be used to calculate the number of people in line at the terminal.

While FIG. 3 depicts a system for determining line length based on trilateration, FIG. 4 depicts a system for determining line length based on angles of received sound.

FIG. 4 depicts a system including a plurality of sound sensors that is configured to determine the length of a line at a terminal 400 in a shopping facility based on angles of received sound, according to some embodiments. The system of FIG. 4 is depicted as having four sound sensors (a first sound sensor 412, a second sound sensor 414, a third sound sensor 416, and a fourth sound sensor 418), although any number of suitable sound sensors can be used. Each of the four sound sensors is positioned at a different angle so that the arrival angle of sounds resulting from guest activity can be determined. The arrival angle of the sound is dependent upon the distance from the sound sensors that the sound originates. For example, sound originating from a guest associated with a first cart 404 (depicted as line 424) arrives at a different angle than sound originating from a guest associated with a second cart 406 (depicted as line 422) and sound originating from a guest associated with a third cart 408 (depicted as line 420). Based on the arrival angle, the distance from the plurality of sound sensors which the sound originates can be determined. This distance, in conjunction with the average distance between carts (denoted by distance "D" 410), can be used to calculate the number of guests in line at the terminal 400.

In the systems described in FIGS. 2-4, an average distance between carts is used to calculate the number of guests in line for a terminal. The average distance can be known or can be learned over time. For example, distances between guests and the terminal (or sound sensors) can be observed and aggregated over time. For the same time period, the number of transactions can be logged. Based on the number of transactions logged and the observed distances between guests, an average distance between carts (or guests) can be determined over time. The average distance between guests may vary based on region and/or culture. For example, in some regions or cultures, guests may stand further apart from one another.

Figure 5:
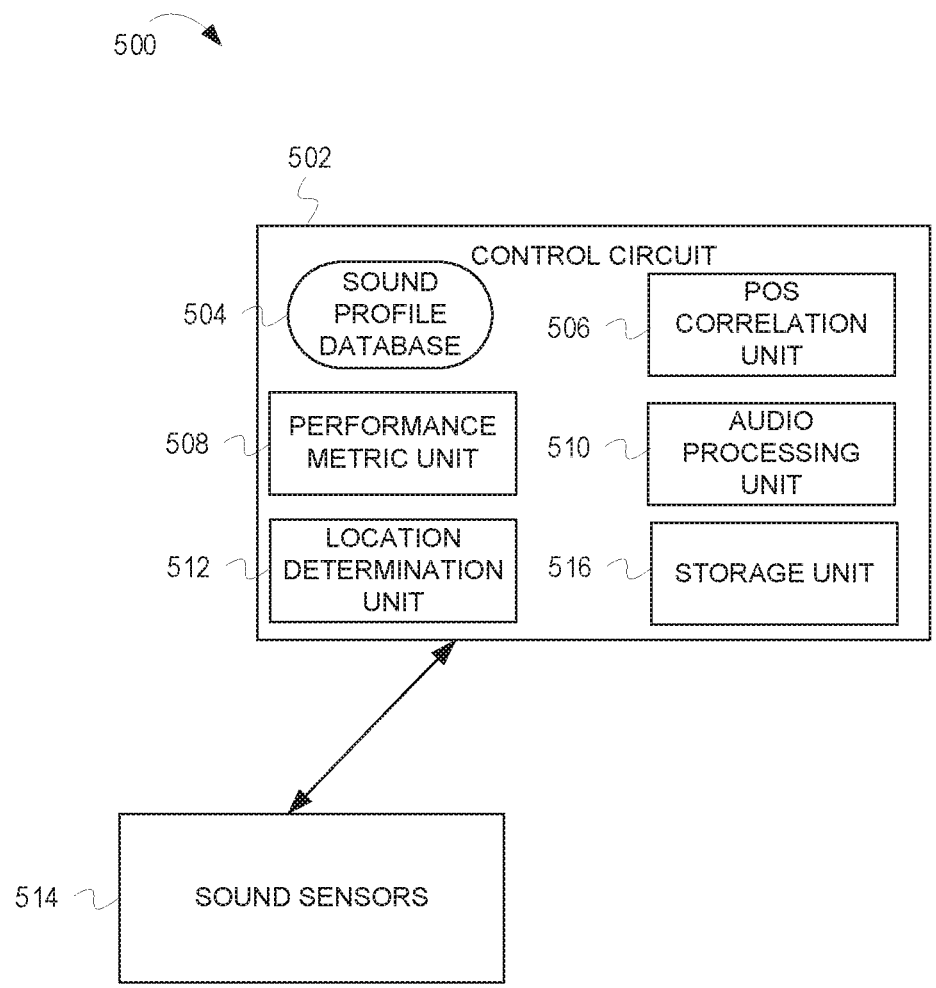
FIG. 5 depicts an example system 500 for capturing and analyzing sounds in a shopping facility, according to some embodiments.

While the discussion of FIGS. 1-4 describes how to determine different performance metrics for an employee, FIG. 5 depicts an example system that can be used to determine the performance metrics for employees.

FIG. 5 depicts an example system 500 for capturing and analyzing sounds in a shopping facility, according to some embodiments. The system 500 includes sound sensors 514 and a control circuit 502. The control circuit 502 may include a processing device and a memory device and may generally be any processor-based device such as one or more of a computer system, a server, a networked computer, a cloud-based server, etc. The processor device may comprise a central processing unit, a processor, a microprocessor, and the like. The processing device may be configured to execute computer readable instructions stored on the memory. The sound sensors 514 can include a single sound sensor or multiple sound sensors and can be positioned in any suitable locations throughout the shopping facility. For example, the sound sensors 514 can be located near the terminals, on the terminals, or in locations remote from the terminals. The control circuit 502 includes a sound profile database 504, a POS correlation unit 506, a performance metric unit 508, an audio processing unit 510, a location determination unit 512, and a storage unit 516.

The sound profile database 504 can store audio information such as speech recognition information and profiles for specific types of sounds (e.g., sounds associated with carts, bags, footsteps, conveyor belts, scanners, etc.). The audio processing unit 510 can analyze the received audio by referencing the sound profile database 504. For example, the audio processing unit 510 can analyze the received audio by referencing the sound profile database 504 to determine that the received sound includes audio that is consistent with a bagging turnstile being rotated. The location determination unit 512 can determine locations of received sounds. For example, the location determination unit 512 can determine from what area of the shopping facility the sound originated (e.g., a specific terminal) based on identifying information included in the received sound. As another example, the location determination unit 512 can determine a length of a line at a terminal based on the received sound (as described previously). The POS correlation unit 506 can correlate POS data (e.g., transaction numbers, items purchased, transaction and/or item values, etc.) with the received sounds. For example, if the received sound indicates a number of bags used in a transaction, the POS correlation unit 506 can correlate a number of items purchased in a transaction to the number of bags used. The performance metric unit 508 determines an employee associated with the received sound (and any other information determined or calculated by the control circuit 502) and determines a performance metric. The employee determination can be based on an employee ID logged into a terminal, a location of the sound and known employee locations, voice recognition, or any other suitable indicator. The storage unit 516 can store any information desired with respect to the received sound. For example, the storage unit 516 can store the received sound, data generated by the audio processing unit 510, data generated by the performance metric unit 508, data generated by the POS correlation unit 506, data generated by the location determination unit 512, and/or information from the sound profile database 504. In some embodiments, the storage unit 516 can store and aggregate information relating to specific employees, groups of employees, types of employees, etc. After determining the performance metric, the control circuit can transmit the performance metric (e.g., a line length and an indication of an employee) and/or an indication of task that should be performed based on the performance metric (e.g., more terminals should be opened to decrease line length).

Figure 6:
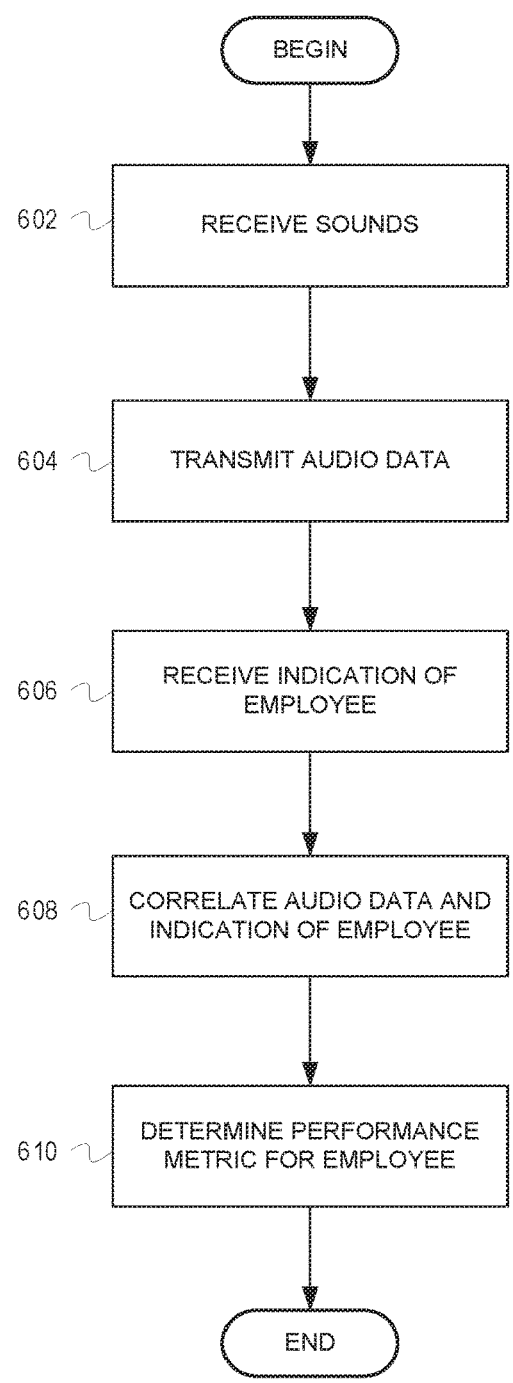
FIG. 6 is a flow diagram depicting example operations for capturing and analyzing sounds in a shopping facility, according to some embodiments.

While FIG. 5 depicts an example system for capturing and analyzing sounds in a shopping facility, FIG. 6 is a flow diagram including example operations for use of such a system.

FIG. 6 is a flow diagram depicting example operations for capturing and analyzing sounds in a shopping facility, according to some embodiments. The flow begins at block 602.

At block 602, sounds are received. For example, the sounds are received by sound sensors in a shopping facility. The sound sensors can be located throughout the shopping facility or in specific areas of the shopping facility. In some embodiments, the sound sensors are located near POS terminals. The sound sensors are configured to capture voices and other audio resulting from activity near the POS terminals. The flow continues at block 604.

At block 604, audio data is transmitted. For example, the sound sensors can transmit the audio data to a control circuit via a communications network. The audio data can include the sounds received by the sound sensors. Additionally, in some embodiments, the audio data can include timestamps and/or markers that, for example, identify from which sound sensor the audio data originated. The flow continues at block 606.

At block 606, an indication of an employee is received. For example, a control circuit receives the indication of the employee. In some embodiments, a computer located at the POS terminal or in a back office can transmit the indication of the employee to the control circuit. For example, the computer can transmit an indication as to which employee is logged in, or which employee is assigned, to the terminal. In other embodiments, the control circuit can determine the indication of the employee based on less explicit information. For example, the control circuit can determine the indication of the employee based on a current time and a work schedule for employees. The flow continues at block 608.

At block 608, the audio data and the indication of the employee are correlated. For example, the control circuit correlates the audio data and the indication of the employee. The control circuit correlates the audio data and the indication of the employee by associating the audio data with the employee. This correlation allows a performance metric to be associated with a specific employee. The flow continues at block 610.

At block 610, a performance metric for the employee is determined. For example, the control circuit determines the performance metric for the employee. The performance metric can be any calculation or statistic relevant to an employee's performance. For example, the performance metric can be related to speed (e.g., time per transaction, line length, etc.), efficiency (e.g., resources used per transaction, number of items per transaction, etc.), procedures to be followed (e.g., greeting customers, engaging customers in a conversation, etc.), etc.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept. For example, although portions of this description refer to determining a single performance metric for an employee, embodiments can be used to determine multiple performance metrics simultaneously for an employee, such as items per bag and line length, line length and guest greeting, or any combination of two or more performance metrics. Additionally, although portions of this description refer to determining performance metrics for a specific employee, in some embodiments performance metrics can be determined for more than one employee. For example, embodiments of the system can be used to determine performance metrics for a group of employees, all employees at a shopping facility, all employees in region, specific types of employees, etc.

In some embodiments, a system comprises one or more sound sensors distributed throughout at least a portion of a shopping facility and configured to receive at least sounds resulting from activity in the shopping facility and a control circuit. The control circuit is communicatively coupled to the one or more sound sensors. The control circuit is configured to receive, from at least one of the one or more sound sensors, audio data, receive an indication of an employee, correlate the audio data and the indication of the employee, and determine, based at least in part on the audio data and the indication of the employee, a performance metric for the employee.

In some embodiments, a method comprises receiving, via one or more sound sensors distributed throughout at least a portion of a shopping facility and configured to receive at least sounds resulting from activity in the shopping facility, audio data, transmitting, via a communications network to a control circuit, the audio data, receiving, at the control circuit, and indication of an employee, correlating, by the control circuit, the audio data and the indication of the employee, and determining, by the control circuit and based at least in part on the audio data and the indication of the employee, a performance metric for the employee.

In some embodiments, a system comprises one or more sound sensors distributed throughout at least a portion of a shopping facility and configured to receive at least sounds resulting from activity in the shopping facility and a control circuit. The control circuit is communicatively coupled to the one or more sound sensors. The control circuit is configured to receive, from at least one of the one or more sound sensors, audio data, receive an indication of an employee, correlate the audio data and the indication of the employee, and determine, based at least in part on the audio data and the indication of the employee, a performance metric for the employee, wherein the performance metric includes one or more of a number of items per bag, occurrence of a conversation between the employee and a guest of the shopping facility, and a length of a line at a terminal associated with the employee.

What is claimed is:

1. A system in a shopping facility for determining a performance metric for an employee, the system comprising:
   one or more sound sensors distributed throughout at least a portion of the shopping facility and configured to receive at least sounds resulting from activity in the shopping facility; and
   a control circuit communicatively coupled to the one or more sound sensors, the control circuit being configured to:
      receive, from at least one of the one or more sound sensors, audio data, wherein the audio data includes sounds associated with items being scanned and sounds associated with bags;
      determine, based on the sounds associated with bags, a number of bags used;
      determine, based on the audio data associated with items being scanned, a number of items scanned;

calculate, based on the number of bags used and the number of items scanned, a number of items per bag;

receive an indication of an employee;

correlate the audio data and the indication of the employee; and determine, based at least in part on the audio data and the indication of the employee, the performance metric for the employee, wherein the performance metric for the employee is based on the number of items per bag.

2. The system of claim 1, wherein the control circuit is further configured to:

determine a preferred number of items per bag;

determine that the number of items per bag is less than the preferred number of items per bag; and transmit, based on the determination that the number of items per bag is less than the preferred number of items per bag, an indication that the performance metric for the employee is below the preferred number of items per bag.

3. The system of claim 2, wherein the indication that the performance metric of the employee is below the preferred number of items per bag includes one or more of the number of items per bag, the indication of the employee, the performance metric for the employee, and a list of items purchased.

4. The system of claim 1, wherein the control circuit is further configured to:

determine a preferred number of items per bag;

determine that the number of items per bag is greater than the preferred number of items per bag; and transmit, based on the determination that the number of items per bag is greater than the preferred number of items per bag, an indication that the performance metric for the employee is above the preferred number of items per bag.

5. The system of claim 4, wherein the indication that the performance metric of the employee is above the preferred number of items per bag includes one or more of the number of items per bag, the indication of the employee, the performance metric for the employee, and a list of items purchased.

6. The system of claim 1, wherein the control circuit is further configured to:

determine, based on point-of-sale (POS) data, that one or more items scanned should not be bagged; and exclude, from the number of items per bag, the one or more items.

7. A method in a shopping facility for determining a performance metric for an employee, the method comprising:

receiving, via one or more sound sensors distributed throughout at least a portion of the shopping facility and configured to receive at least sounds resulting from activity in the shopping facility, audio data, wherein the audio data incudes sounds associated with guests of the shopping facility;

transmitting, via a communications network to a control circuit, the audio data;

receiving, at the control circuit, an indication of an employee;

calculating, based on the sounds associated with guests of the shopping facility, a length of a line at a terminal associated with the employee;

correlating, by the control circuit, the audio data and the indication of the employee; and determining, by the control circuit and based at least in part on the audio data and the indication of the employee, the performance metric for the employee, wherein the performance metric for the employee is based on the length of the line at the terminal associated with the employee.

8. The method of claim 7, wherein the length of the line at the terminal associated with the employee is based, at least in part, on an average distance between carts.

9. The method of claim 7, wherein the calculating the length of the line at the terminal associated with the employee is based, at least in part, on signal strength of the audio data.

10. The method of claim 7, wherein the one or more sound sensors include at least on sound sensor located at the terminal.

11. The method of claim 7, wherein the sounds associated with guests of the shopping facility include voices, and wherein the calculating the length of the line further comprises:

determining distances from the terminal for one or more of the voices.

12. The method of claim 7, wherein the sounds associated with guests of the shopping facility include cart noises, and wherein the calculating the length of the line further comprises:

determining distanced from the terminal for one or more of the cart noises.

13. A system comprising:

one or more sound sensors distributed throughout at least a portion of a shopping facility and configured to receive at least sounds resulting from activity in the shopping facility; and a control circuit communicatively coupled to the one or more sound sensors, the control circuit being configured to:

receive, from at least one of the one or more sound sensors, audio data;

receive an indication of an employee;

correlate the audio data and the indication of the employee; and determine, based at least in part on the audio data and the indication of the employee, a performance metric for the employee, wherein the performance metric includes one or more of a number of items per bag and a length of a line at a terminal associated with the employee.

14. The system of claim 13, wherein the performance metric for the employee is based on the number of items per bag, wherein the audio data includes sounds associated with items being scanned and sounds associated with bags, the control circuit further configured to:

determine, based on the sounds associated with bags, a number of bags used;

determine, based on the audio data associated with items being scanned, a number of items scanned; and calculate, based on the number of bags used and the number of items scanned, the number of items per bag.

15. The system of claim 14, wherein the control circuit is further configured to:

determine a preferred number of items per bag;

determine that the number of items per bag is less than the preferred number of items per bag; and transmit, based on the determination that the number of items per bag is less than the preferred number of items per bag, an indication that the performance metric for the employee is below the preferred number of items per bag.

16. The system of claim 15, wherein the indication that the performance metric of the employee is below the preferred number of items per bag includes one or more of the number of items per bag, the indication of the employee, the performance metric for the employee, and a list of items purchased.

17. The system of claim 14, wherein the control circuit is further configured to:
   determine, based on point-of-sale (POS) data, that one or more items scanned should not be bagged; and
   exclude, from the number of items per bag, the one or more items.

18. The method of claim 13, wherein the performance metric for the employee is based on the length of a line at a terminal associated with the employee, wherein the audio data includes sounds associated with guests of the shopping facility, the method further comprising:
   calculating, based on the sounds associated with guests of the shopping facility, the length of the line at the terminal associated with the employee.

19. The method of claim 18, wherein the sounds associated with guests of the shopping facility include voices, and wherein the calculating the length of the line further comprises:
   determining distances from the terminal for one or more of the voices.

20. The method of claim 18, wherein the sounds associated with guests of the shopping facility include cart noises, and wherein the calculating the length of the line further comprises:
   determining distances from the terminal for one or more of the cart noises.

* * * * *

UNITED STATES PATENT AND TRADEMARK OFFICE
CERTIFICATE OF CORRECTION

PATENT NO. : 10,020,004 B2  
APPLICATION NO. : 15/492608  
DATED : July 10, 2018  
INVENTOR(S) : Nicholaus A. Jones et al.

Page 1 of 1

It is certified that error appears in the above-identified patent and that said Letters Patent is hereby corrected as shown below:

In the Claims

Column 10, Line 16, in Claim 10, before "sound" delete "on" and insert -- one --, therefor.

Column 11, Line 16, in Claim 18, before "of claim" delete "method" and insert -- system --, therefor.

Column 12, Line 6, in Claim 19, before "of claim" delete "method" and insert -- system --, therefor.

Column 12, Line 12, in Claim 20, before "of claim" delete "method" and insert -- system --, therefor.

Signed and Sealed this  
Thirtieth Day of October, 2018

Andrei Iancu  
*Director of the United States Patent and Trademark Office*